United States Patent
Shi et al.

(10) Patent No.: US 12,028,162 B2
(45) Date of Patent: Jul. 2, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 519 days.

(21) Appl. No.: 17/236,879

(22) Filed: Apr. 21, 2021

(65) Prior Publication Data
US 2021/0242976 A1     Aug. 5, 2021

Related U.S. Application Data

(63) Continuation of application No. PCT/CN2018/113807, filed on Nov. 2, 2018.

(51) Int. Cl.
*H04L 1/1812* (2023.01)
*H04W 72/23* (2023.01)

(52) U.S. Cl.
CPC ........... *H04L 1/1812* (2013.01); *H04W 72/23* (2023.01)

(58) Field of Classification Search
CPC ............................. H04L 1/1812; H04W 72/23
See application file for complete search history.

(56) References Cited

U.S. PATENT DOCUMENTS

| | | | |
|---|---|---|---|
| 2013/0223318 A1 | 8/2013 | Liu et al. | |
| 2015/0173102 A1* | 6/2015 | Ruiz Delgado | H04L 5/0005 370/280 |
| 2021/0235436 A1* | 7/2021 | Takeda | H04W 72/20 |
| 2021/0242922 A1* | 8/2021 | Koskela | H04W 72/53 |
| 2022/0116185 A1* | 4/2022 | Liang | H04L 5/0007 |

FOREIGN PATENT DOCUMENTS

| | | |
|---|---|---|
| CN | 102420683 A | 4/2012 |
| CN | 108631958 A | 10/2018 |

OTHER PUBLICATIONS

International Search Report in the international application No. PCT/CN2018/113807, mailed on Jul. 25, 2019.
(Continued)

*Primary Examiner* — Kevin M Cunningham
(74) *Attorney, Agent, or Firm* — PERKINS COIE LLP

(57) ABSTRACT

Provided are a wireless communication method, a terminal device and a network device. The method includes: a terminal device determining a hybrid automatic repeat request (HARQ) process; and according to the HARQ process, the terminal device receiving and/or sending a signal. In the implementations of the present disclosure, by means of determining an HARQ process, the terminal device may effectively differentiate an HARQ process applicable to each TRP among a plurality of TRPs when performing transmission by means of the plurality of TRPs, thereby preventing HARQ process ambiguity, and improving system performance.

16 Claims, 3 Drawing Sheets

(56) References Cited

OTHER PUBLICATIONS

Extended European Search Report for European Application No. 18938729.3 issued Oct. 12, 2021. 8 pages.
Huawei et al. "DL multi-TRP/panel operation in R15" R1-1802073; 3GPP TSG RAN WG1 Meeting #92; Athens, Greece, Feb. 26-Mar. 2, 2018. 3 pages.
Search Report of the European application No. 23189058.3, issued on Aug. 9, 2023. 7 pages.

* cited by examiner

WIRELESS COMMUNICATION METHOD, TERMINAL DEVICE AND NETWORK DEVICE

CROSS-REFERENCE TO RELATED APPLICATION

The present application is a continuation application of International PCT Application No. PCT/CN2018/113807, filed on Nov. 2, 2018, the entire content of which is hereby incorporated by reference.

TECHNICAL FIELD

Implementations of the present disclosure relate to the field of communication, and more specifically, to a communication method, a terminal device and a network device.

BACKGROUND

In current discussion about NR (New Radio)/5G, two approaches are supported for simultaneous UE (User Equipment) transmission through multiple Transmission Reception Points (TRP), multiple Antenna Panels or multiple beams. A first approach is that the UE only receives one NR-PDCCH, and this NR-PDCCH indicates related indication information of data transmitted on multiple TRPs/beams. A second approach is that the UE receives different NR-PDCCHs from different TRPs/beams, and each NR-PDCCH indicates related indication information about a corresponding data transmission.

In the 15th release (Rel-15), both DCI (Downlink Control Information) of uplink scheduling and DCI of downlink scheduling contain HARQ process information corresponding to scheduled data (PUSCH or PDSCH). For the second approach, if the existing 16 processes are used, 16 processes need to be shared by transmissions corresponding to different TRPs, which may quite possibly cause unnecessary stop-and-wait, thus affecting the data transmission rate.

In addition, if a same HARQ process number is used by two TRP transmissions, an ambiguity problem will be caused.

SUMMARY

A wireless communication method, a terminal device and a network device are provided, when the terminal device performs transmission through multiple TRPs, HARQ processes applicable to the multiple TRPs can be effectively distinguished, thereby avoiding ambiguity of HARQ processes and improving system performance.

In a first aspect, there is provided a wireless communication method, including:
 determining, by a terminal device, a hybrid automatic repeat request (HARQ) process; and
 receiving and/or sending, by the terminal device, a signal according to the HARQ process.

In a second aspect, there is provided a wireless communication method, including:
 determining, by a network device, a hybrid automatic repeat request (HARQ) process; and
 receiving and/or sending, by the network device, a signal from/to a terminal device according to the HARQ process.

In a third aspect, there is provided a terminal device configured to perform the method in the above first aspect or various implementations thereof. Specifically, the terminal device includes function modules configured to perform the method in the above first aspect or various implementations thereof.

In a fourth aspect, there is provided a network device configured to perform the method in the above second aspect or various implementations thereof. Specifically, the network device includes function modules configured to perform the method in the above second aspect or various implementations thereof.

In a fifth aspect, there is provided a terminal device, including a processor and a memory. The memory is configured to store a computer program, and the processor is configured to call and run the computer program stored in the memory to perform the method in the above first aspect or various implementations thereof.

In a sixth aspect, there is provided a network device, including a processor and a memory. The memory is configured to store a computer program, and the processor is configured to call and run the computer program stored in the memory to perform the method in the above second aspect or various implementations thereof.

In a seventh aspect, there is provided a chip configured to implement the method in any one of the above first to second aspects or in various implementations thereof. Specifically, the chip includes a processor configured to call and run a computer program from a memory, such that a device in which the chip is installed performs the method in any one of the above first to second aspects or in various implementations thereof.

In an eighth aspect, there is provided a computer readable storage medium configured to store a computer program which enables a computer to perform the method in any one of the above first to second aspects or in various implementations thereof.

In a ninth aspect, there is provided a computer program product including computer program instructions that enable a computer to perform the method in any one of the above first to second aspects or in various implementations thereof.

In a tenth aspect, there is provided a computer program which, when run on a computer, enables the computer to perform the method in any one of the above first to second aspects or in various implementations thereof.

Based on the above technical solutions, by determining an HARQ process, the terminal device can effectively distinguish an HARQ process applicable to each TRP among multiple TRPs when performing transmission through the multiple TRPs, thereby preventing ambiguity of HARQ processes, and improving the system performance.

DETAILED DESCRIPTION

The technical solutions in the implementations of the present disclosure are described below with reference to the accompanying drawings.

Figure 1:
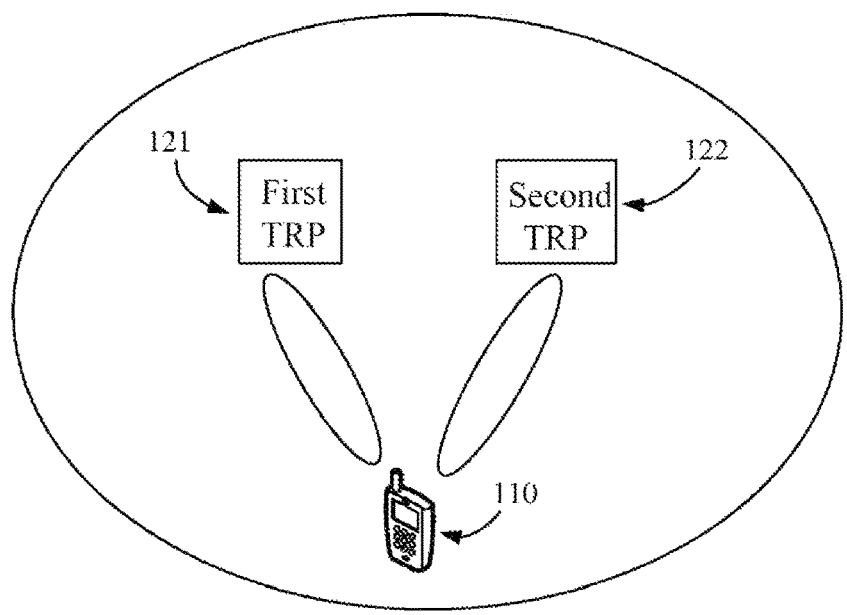
FIG. 1 is an example of an application scenario according to an implementation of the present disclosure.

FIG. 1 is an example diagram of a 5G communication system 100 according to an implementation of the present disclosure.

As shown in FIG. 1, the communication system 100 may include a terminal device 110, a first TRP 121 and a second TRP 122. The first TRP 121 and the second TRP 122 may communicate with the terminal device 110 respectively through air interfaces. Specifically, each of the first TRP 121 and the second TRP 122 may schedule a data transmission to the terminal device 110, respectively.

Specifically, the terminal device 110 detects PDCCH(s) from the first TRP 121 and/or the second TRP 122 for scheduling multiple uplink data transmissions (or multiple downlink data transmissions). Optionally, the PDCCH(s) of the first TRP 121 and the PDCCH of the second TRP 122 may be the same PDCCH or different PDCCHs, which is not specifically limited in implementations of the present disclosure.

It should be understood that, in the communication system shown in FIG. 1, there may be multiple communication scenarios. This is not specifically restricted in implementations of the present disclosure.

For example, the first TRP 121 and the second TRP 122 belong to the same cell, and a connection (backhaul) between the first TRP 121 and the second TRP 122 is ideal, that is, information interaction may be performed rapidly and dynamically.

For another example, the first TRP 121 and the second TRP 122 belong to the same cell, and the connection between the first TRP 121 and the second TRP 122 is non-ideal, that is, information interaction between the first TRP 121 and the second TRP 122 cannot be performed quickly, and only relatively slow data interaction can be performed.

For another example, the first TRP 121 and the second TRP 122 belong to different cells, and the connection between the first TRP 121 and the second TRP 122 is ideal.

For still another example, the first TRP 121 and the second TRP 122 belong to different cells, and the connection between the first TRP 121 and the second TRP 122 is non-ideal.

In this implementation, the first TRP 121 and the second TRP 122 can communicate with the terminal device 110 at the same time.

Specifically, there are two approaches supported hat the first TRP 121 and the second TRP 122 perform transmission with the terminal device 110 at the same time. A first approach is that the terminal device 110 only receives one NR-PDCCH, and this NR-PDCCH indicates related indication information of data transmitted on the first TRP 121 and the second TRP 122. A second approach is that the terminal device 110 receives different NR-PDCCHs from the first TRP 121 and the second TRP 122 respectively, and each NR-PDCCH indicates related indication information of a corresponding data transmission.

Optionally, both Downlink Control Information (DCI) of uplink scheduling and DCI of downlink scheduling contain HARQ process information corresponding to scheduled data (PUSCH or PDSCH). For the second approach, if the number of available HARQ processes in the communication system is limited, a limited number of HARQ processes need to be shared by transmissions corresponding to different TRPs, which may quite possibly cause unnecessary stop-and-wait, and thus affect the data transmission rate.

In addition, if a same HARQ process number is used by two TRP transmissions, an ambiguity problem will be caused.

An implementation of the present disclosure provides a communication method, so that when the terminal device 110 performs transmission through the first TRP 121 and the second TRP 122, the HARQ process applicable to each of the first TRP 121 and the second TRP 122 can be effectively distinguished, thereby avoiding the ambiguity of HARQ processes and improving the system performance.

It should be understood that the 5G communication system 100 is taken as an example for exemplarily describing implementations of the present disclosure. However, the implementations of the present disclosure are not limited thereto. In other words, the technical solutions of the implementations of the present disclosure may be applied to any communication system in which multiple network devices can independently schedule a terminal to transmit data.

Figure 2:
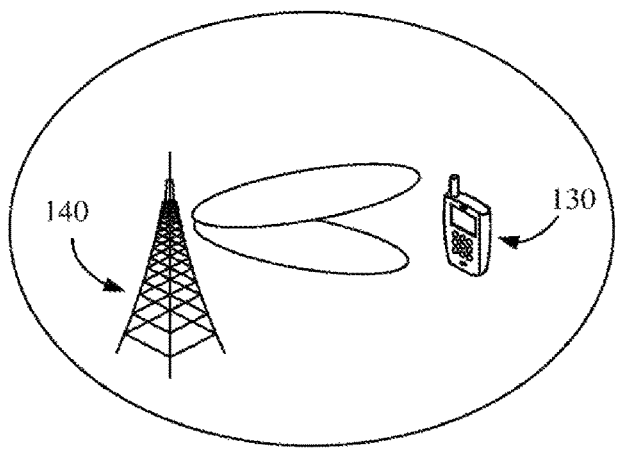
FIG. 2 is an example of an application scenario according to an implementation of the present disclosure.

For example, if TRPs in FIG. 1 correspond to beams, accordingly an example of an application scenario as shown in FIG. 2 may be obtained. The scenario includes a terminal device 130 and a network device 140, wherein there are multiple beams between the terminal device 130 and the network device 140.

For example, the communication system may be a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, and a Universal Mobile Telecommunication System (UMTS) system, etc.

Various implementations are described in combination with a network device and a terminal device in the present disclosure.

The network device 120 may refer to any entity at a network side for sending or receiving signals. For example, the network device may be a user device of Machine Type Communication (MTC), a Base Transceiver Station (BTS) in GSM or CDMA, a NodeB in WCDMA, an Evolution Node B (eNB or NodeB) in LTE, a base station device in a 5G network, etc.

In addition, the terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a hand-held device with a wireless communication function, a computing device, or another processing device connected to a wireless modem, an on-board device, a wearable device, a terminal device in a 5G network or the like.

Figure 3:
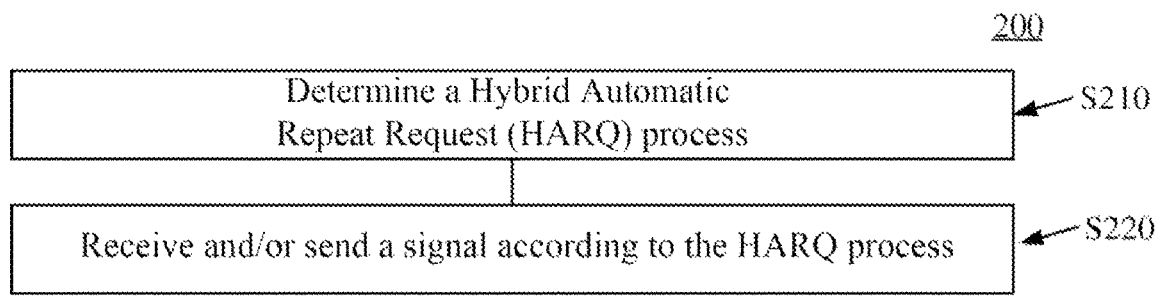
FIG. 3 is a schematic flow chart of a communication method according to an implementation of the present disclosure.

FIG. 3 is a schematic flow chart of a communication method 200 according to an implementation of the present disclosure.

As shown in FIG. 3, the method 200 may include acts S210 and S220.

In S210, a Hybrid Automatic Repeat Request (HARQ) process is determined.

In S220, a signal is received and/or sent according to the HARQ process.

It should be understood that the method 200 shown in FIG. 3 may be performed by a network device or a terminal device. This is not specifically restricted in implementations of the present disclosure. For example, the method 200 shown in FIG. 2 may be executed by the terminal device 110 shown in FIG. 1, for another example, the method 200 shown in FIG. 2 may also be executed by the terminal device 130 or the network device 140 shown in FIG. 2.

For example, if the method 200 shown in FIG. 2 is executed by a terminal device, after the terminal device determines the HARQ process, the terminal device receives a signal sent by the network device according to the HARQ process, or the terminal device sends the HARQ process to the network device according to the HARQ process.

For another example, if the method 200 shown in FIG. 2 is executed by a network device, after the network device determines the HARQ process, the network device may receive a signal sent by the terminal device according to the HARQ process, or the network device may send a signal to the terminal device according to the HARQ process.

Optionally, a signal in an implementation of the present disclosure may be one or multiple signals.

For example, the signal may include at least one uplink signal and/or at least one downlink signal.

For another example, the signal may include at least one Physical Uplink Shared Channel (PUSCH) and/or at least one Physical Downlink Shared Channel (PDSCH).

Optionally, the signal may be a signal sent through at least one intermediate device.

For example, the signal may include a signal sent to or received from the terminal device through at least one of at least one Transmission Reception Point (TRP), at least one Antenna panel, and at least one beam.

In actual work, for example, an executor of the method 200 is a terminal device. When the terminal device needs to receive or send multiple signals, the terminal device first determines multiple HARQ processes corresponding to the multiple signals, and then receives or sends the multiple signals based on the multiple HARQ processes. In an implementation of the application, by determining the HARQ process, the terminal device can effectively distinguish the HARQ process applicable to each TRP in multiple TRPs when the terminal device performs transmission through the multiple TRPs, thereby avoiding the ambiguity of the HARQ processes and improving the system performance.

The specific implementation mode of determining the HARQ process by the terminal device or the network device will be described in detail below.

Implementation One

In an implementation of the present disclosure, before the terminal device determines an HARQ process, the terminal device receives configuration information sent by a network device, and the terminal device determines the number of bits of a process number of the HARQ process according to the configuration information. In other words, the network device generates the configuration information and sends the same to the terminal device.

Optionally, the configuration information may include: the number of Physical Downlink Control Channels (PDCCH) that the terminal device needs to detect at the same time.

Therefore, the terminal device can determine the number of bits of a process number of the HARQ process according to the number of PDCCHs that the terminal device needs to detect at the same time. For example, assuming that the number of PDCCHs that the terminal device needs to detect at the same time is 2, the terminal device may directly determine that the number of bits of a process number of the HARQ process is 5 bits. That is, there are 32 available HARQ processes in the communication system. Further, the terminal device can directly determine the HARQ process corresponding to the signal to be received and/or the signal to be sent according to the process number of the HARQ process.

In an implementation of the application, compared with a communication system with 16 available HARQ processes, through the configuration information, the terminal device can effectively increase the limited number of HARQ processes that need to be shared by transmissions corresponding to different TRPs, thereby effectively reducing unnecessary stop-and-wait of the terminal device, and further improving the data transmission rate.

Optionally, the configuration information includes: the number of bits of the process number of the HARQ process.

In an implementation of the application, the network device directly indicates the number of bits of the process number of the HARQ process to the terminal device through the configuration information, which is then used by the terminal device to determine the process number of the HARQ process.

Optionally, in some implementations of the present disclosure, the terminal device receives the configuration information sent by the network device through at least one of Downlink Control Information (DCI), Radio Resource Control (RRC) signaling and Media Access Control (MAC) Control Element (CE).

To sum up, in an implementation of the present disclosure, by increasing the number of HARQ processes available in the communication system (for example, to 32), the limited number of HARQ processes that need to be shared corresponding to different signals can be effectively increased, thereby effectively reducing the unnecessary stop-and-wait of the terminal device and further improving the data transmission rate.

It should be understood that the terminal device receives the configuration information sent by the network device is only an example of an implementation of the present disclosure, and should not be construed as a specific limitation on an implementation of the present disclosure.

For example, when the network device determines that the number of bits of the process number of the HARQ process is not a default value, the network device sends the configuration information to the terminal device. Accordingly, when the network device determines that the number of bits of the process number of the HARQ process is a default value, the network device does not send the configuration information to the terminal device. For example, the default value is 4 bits.

Implementation Two

In an implementation of the present disclosure, before the terminal device determines an HARQ process, the terminal device receives configuration information sent by a network device; and the terminal device determines whether a target domain exists and/or the number of bits corresponding to the target domain according to the configuration information, wherein the target domain is used for the terminal device to determine an HARQ process group.

In other words, the network device generates the configuration information and sends the same to the terminal device.

It should be understood that in the implementations of the present disclosure, the specific HARQ processes included in the HARQ process group are not limited. For example, assuming that the system divides the available HARQ processes into two HARQ process groups, and the HARQ processes in the two HARQ process groups may be completely the same, partially the same or completely different, which is not specifically limited in an implementation of the present disclosure.

In an implementation of the present disclosure, when the terminal device or the network device receives and/or sends a signal according to an HARQ process, an HARQ process corresponding to the signal to be received and/or the signal to be sent can be determined by the process number of the HARQ process and the process group to which the HARQ process belongs, and then the signal is received and/or sent based on the determined HARQ process.

Optionally, the configuration information may include: the number of PDCCHs that the terminal device needs to detect at the same time.

Therefore, the terminal device can determine whether a target domain exists and/or the number of bits corresponding to the target domain according to the number of PDCCHs that the terminal device needs to detect at the same time.

For example, assuming that the number of PDCCHs that the terminal device needs to detect at the same time is 2, the terminal device can directly determine that a target domain exists and the number of bits corresponding to the target domain is 1 bit. That is, there are two available HARQ process groups included in the communication system. Further, the terminal device may directly determine the HARQ process corresponding to the signal to be received and/or the signal to be sent according to the process number of the HARQ process and the HARQ process group to which the HARQ process belongs, and then receive and/or send the signal based on the determined HARQ process.

Optionally, the configuration information may include the number of bits corresponding to the target domain.

In an implementation of the present disclosure, the number of bits corresponding to the target domain is used by the terminal device to determine the HARQ process group.

For example, the number of bits corresponding to the target domain is used by the terminal device to determine the number of HARQ process groups, and then the terminal device can determine, based on the number of the HARQ process groups, the HARQ process group to which the HARQ process corresponding to the signal to be received and/or the signal to be sent belongs.

For another example, the number of bits corresponding to the target domain is used by the terminal device to determine the HARQ process group to which the HARQ process corresponding to the signal to be received and/or the signal to be sent belongs, that is, the target domain is used for carrying the indication information of the HARQ process group to which the HARQ process corresponding to the signal to be received and/or the signal to be sent belongs.

Optionally, the configuration information may include the number of the HARQ process groups.

Optionally, in some implementations of the present disclosure, the terminal device receives the configuration information sent by the network device through at least one of Downlink Control Information (DCI), Radio Resource Control (RRC) signaling and Media Access Control (MAC) Control Element (CE).

To sum up, in an implementation of the present disclosure, the available HARQ processes of the system are divided into HARQ process groups, wherein one HARQ process group may include at least one HARQ process, and the HARQ processes corresponding to different signals can be effectively distinguished by the HARQ process group, thus avoiding the ambiguity problem caused by that multiple signals use the same HARQ process number. Thereby the data transmission rate is improved.

It should be understood that the terminal device receives the configuration information sent by the network device is only an example of an implementation of the present disclosure, and should not be construed as a specific limitation on the implementations of the present disclosure.

For example, in other alternative implementations, when the network device determines that the target domain needs to exist, the network device sends the configuration information to the terminal device. Accordingly, when the network device determines that the target domain does not need to exist, the network device does not send the configuration information to the terminal device. In other words, when the terminal device receives the configuration information, it can directly determine that the target domain exists according to the configuration information, and when the terminal device does not receive the configuration information, it can directly determine that the target domain does not exist.

In an implementation of the present disclosure, after a terminal device or a network device determines the HARQ process group to which the HARQ process belongs, the terminal device or the network device may determine the HARQ process according to the HARQ process group and the process number of the HARQ process.

That is, after the terminal device or the network device determines a process number and a process group, the terminal device or the network device determines an HARQ process corresponding to the process number in the process group as the HARQ process.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

An implementation mode of determining the HARQ process group to which the HARQ process belongs by the terminal device or the network device according to an implementation of the present disclosure will be described in detail below.

Optionally, the terminal device or the network device may determine the HARQ process group according to a Search Space (SS) in which DCI detected by the terminal device is located. It should be understood that in other alternative implementations, the Search Space (SS) may also be referred to as a search space set (SS set). Optionally, the search space (SS) of the terminal device in an implementation of the present disclosure may be configured by the network device. For example, before the terminal device determines the HARQ process group according to the search space (SS) of the terminal device, the terminal device needs to receive information generated by the network device for configuring the search space (SS) of the terminal device.

Implementation Three

The terminal device or the network device may determine the HARQ process group to which the HARQ process belongs in the following manner: determining an HARQ process group corresponding to an SS group to which the SS belongs as the HARQ process group to which the HARQ process belongs.

In an implementation of the present disclosure, the terminal device or the network device may determine the HARQ process according to the process number of the HARQ process and the HARQ process group to which the HARQ process belongs.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

Optionally, the network device configures corresponding SSs to the terminal device, and each SS corresponds to a different group.

For example, if a DCI for scheduling a PDSCH/PUSCH belongs to SS X and a group corresponding to SS X is A, an HARQ process number a corresponding to the scheduled PDSCH/PUSCH corresponds to an HARQ process number in an HARQ process group M, wherein the search space group A corresponds to the HARQ process group M.

For another example, if a DCI for scheduling a PDSCH/PUSCH belongs to SS Y and a group corresponding to SS Y is B, an HARQ process number b corresponding to the scheduled PDSCH/PUSCH corresponds to an HARQ process number in an HARQ process group N, wherein the search space group B corresponds to the HARQ process group N.

It can be found that even though the above HARQ process number a and HARQ process number b have the same value, they still represent different HARQ processes because they belong to different HARQ process groups. Therefore, the ambiguity problem mentioned above can be avoided.

It should be understood that in an implementation of the present disclosure, one SS group may correspond to one HARQ process group, or one SS group may correspond to multiple HARQ process groups, and multiple SS groups may correspond to one HARQ process group as well, which is not specifically limited in implementations of the present disclosure.

Implementation Four

The terminal device or the network device may determine the HARQ process group to which the HARQ process belongs in the following manner: according to a control resource set (CORESET) corresponding to the SS, determining an HARQ process group corresponding to a CORESET group to which the CORESET belongs as the HARQ process group.

In an implementation of the present disclosure, the terminal device or the network device may determine the HARQ process according to the process number of the HARQ process and the HARQ process group to which the HARQ process belongs.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

Optionally, the network device configures corresponding SSs to the terminal device, wherein each SS corresponds to one CORESET, and each CORESET corresponds to a different group.

For example, if a DCI for scheduling a PDSCH/PUSCH corresponds to CORESET X belonging to group A, an HARQ process number a corresponding to the scheduled PDSCH/PUSCH corresponds to an HARQ process number in an HARQ process group M, wherein the CORESET group A corresponds to the HARQ process group M.

For another example, if a DCI for scheduling a PDSCH/PUSCH corresponds to CORESET X belonging to group B, an HARQ process number b corresponding to the scheduled PDSCH/PUSCH corresponds to an HARQ process number in an HARQ process group N, wherein the CORESET group B corresponds to the HARQ process group N.

It can be found that even though the above HARQ process number a and HARQ process number b have the same value, they still represent different HARQ processes because they belong to different HARQ process groups. Therefore, the ambiguity problem mentioned above can be avoided.

It should be understood that in an implementation of the present disclosure, one SS group may correspond to one Control Resource Set (CORESET), or one SS group may correspond to multiple CORESETs, and multiple SSs may correspond to one CORESET as well, which is not specifically limited in implementations of the present disclosure.

Implementation Five

The terminal device or the network device may determine the HARQ process group to which the HARQ process belongs in the following manner: determining an HARQ process group indicated in configuration information corresponding to the SS as the HARQ process group. In other words, the SS of the terminal device carries information indicating the HARQ process group.

Optionally, the configuration information corresponding to the SS is configuration information based on an RRC signaling and/or an MAC CE. That is, the network device sends the configuration information corresponding to the SS to the terminal device through an RRC signaling and/or an MAC CE, and the configuration information corresponding to the SS carries the information indicating the HARQ process group.

Optionally, the network device configures a corresponding SS to the terminal device.

Further, each SS carries additional configuration information. For example, assuming that a DCI for scheduling a PDSCH/PUSCH belongs to SS X, the configuration information carried by SS X may be used for indicating the group information corresponding to the HARQ process number in the DCI.

In an implementation of the present disclosure, the terminal device or the network device may determine the HARQ process according to the process number of the HARQ process and the HARQ process group to which the HARQ process belongs.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

Implementation Six

The terminal device or the network device may determine the HARQ process group to which the HARQ process belongs in the following manner: determining an HARQ process group indicated in configuration information corresponding to a control resource set (CORESET) corresponding to the SS as the HARQ process group. In other words, the CORESET corresponding to the SS of the terminal device carries information indicating the HARQ process group.

Optionally, the configuration information corresponding to the control resource set (CORESET) corresponding to the SS is configuration information based on an RRC signaling and/or an MAC CE. That is, the network device sends the configuration information corresponding to the SS to the terminal device through an RRC signaling and/or an MAC CE, and the configuration information corresponding to the SS carries the information indicating the HARQ process group.

Optionally, the network device configures corresponding SSs to the terminal device.

Furthermore, each SS may correspond to one CORESET, and each CORESET carries additional configuration information. If a DCI for scheduling a PDSCH/PUSCH belongs to a certain search space and this search space is associated with CORESET X, the configuration information corresponding to CORESET X is used for indicating the group information corresponding to an HARQ process number in DCI.

In an implementation of the present disclosure, the terminal device or the network device may determine the HARQ process according to the process number of the HARQ process and the HARQ process group to which the HARQ process belongs.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

Implementation Seven

The terminal device receives indication information sent by the network device, wherein the indication information is used for indicating an HARQ process group to which the HARQ process belongs.

In other words, after the network device determines the HARQ process group to which the HARQ process belongs, the network device generates the configuration information and sends the same to the terminal device.

In an implementation of the present disclosure, the terminal device or the network device may determine the HARQ process according to the process number of the HARQ process and the HARQ process group to which the HARQ process belongs.

Therefore, even HARQ processes with the same process number can be distinguished by the HARQ process groups to which they belong, that is, the technical solution of an implementation of the present disclosure can effectively distinguish HARQ processes corresponding to different signals by the process numbers of HARQ processes and the HARQ process groups to which they belong, thus avoiding the ambiguity problem caused by that multiple signals use the same HARQ process number, and further improving the data transmission rate.

Further, the terminal device receives downlink control information (DCI) sent by the network device, and scrambling information and/or Radio Network Temporary Identifier (RNTI) information of the DCI is used for indicating the HARQ process group to which the HARQ process belongs.

The preferred implementations of the present disclosure have been described in detail above with reference to the attached drawings, but the present disclosure is not limited to the specific details in the above implementations. Within the technical conception of the present disclosure, various simple variations can be made to the technical solutions of the present disclosure, and these simple variations all belong to the protection scope of the present disclosure.

For example, various specific technical features described in the above specific implementations can be combined in any suitable manner when there is no contradiction. In order to avoid unnecessary repetition, various possible combinations are not explained separately in the present disclosure.

For another example, various implementations of the present disclosure can be combined arbitrarily, as long as they do not violate the idea of the present disclosure, they should also be regarded as contents disclosed in the present disclosure.

For example, in the implementations of the present disclosure, the method of determining the HARQ process by the terminal device and the method of determining the HARQ process by the network device may be the same or different. This is not specifically restricted in the implementations of the present disclosure. For example, the network device may determine the HARQ process by the method of Implementation Three, and the terminal device may determine the HARQ process by the method of Implementation Two.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

Method implementations of the present disclosure are described in detail above in combination with FIG. 3, and device implementations of the present disclosure will be described in detail below in combination with FIGS. 4 to 7.

Figure 4:
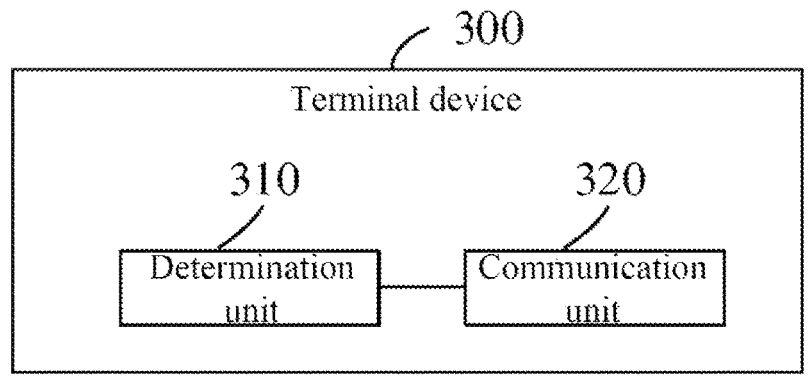
FIG. 4 is a schematic block diagram of a terminal device according to an implementation of the present disclosure.

FIG. 4 is a schematic block diagram of a terminal device 300 according to an implementation of the present disclosure.

As illustrated in FIG. 4, the terminal device 300 includes: a determination unit 310 configured to determine a hybrid automatic repeat request (HARQ) process; and a communication unit 320 configured to receive and/or send a signal according to the HARQ process.

Optionally, in some implementations of the present disclosure, the communication unit 320 is further configured to: receive configuration information sent by a network device, wherein the determination unit 310 is specifically configured to: determine the number of bits of a process number of the HARQ process according to the configuration information.

Optionally, in some implementations of the present disclosure, the configuration information includes: the number of physical downlink control channels (PDCCH) that the terminal device needs to detect at the same time.

Optionally, in some implementations of the present disclosure, the configuration information includes: the number of bits of the process number of the HARQ process.

Optionally, in some implementations of the present disclosure, before the determination unit 310 determines the hybrid automatic repeat request (HARQ) process, the communication unit 320 is further configured to: receive configuration information sent by network device, wherein the determination unit 310 is specifically configured to: determine whether a target domain exists and/or the number of bits corresponding to the target domain according to the configuration information, wherein the target domain is used for the terminal device to determine an HARQ process group.

Optionally, in some implementations of the present disclosure, the configuration information includes:
the number of physical downlink control channels (PDCCH) that the terminal device needs to detect at the same time.

Optionally, in some implementations of the present disclosure, the configuration information includes: the number of bits corresponding to the target field.

Optionally, in some implementations of the present disclosure, the configuration information includes: the number of HARQ process groups.

Optionally, in some implementations of the present disclosure, the communication unit 320 is specifically configured to: receive the configuration information sent by the network device through at least one of downlink control information (DCI), radio resource control (RRC) signaling and media access control (MAC) Control Element (CE).

Optionally, in some implementations of the present disclosure, the determination unit 310 is specifically configured to: determine an HARQ process group to which the HARQ process belongs; and determine the HARQ process according to the HARQ process group and a process number of the HARQ process.

Optionally, in some implementations of the present disclosure, the determination unit 310 is more specifically configured to: determine the HARQ process group according to a search space (SS) of the terminal device.

Optionally, in some implementations of the present disclosure, the determination unit 310 is more specifically configured to: determine an HARQ process group corresponding to an SS group to which the SS belongs as the HARQ process group to which the HARQ process belongs.

Optionally, in some implementations of the present disclosure, the determination unit 310 is more specifically configured to: determine, according to a control resource set (CORESET) corresponding to the SS, an HARQ process group corresponding to a CORESET group to which the CORESET belongs as the HARQ process group.

Optionally, in some implementations of the present disclosure, the determination unit 310 is more specifically configured to: determine an HARQ process group indicated in configuration information corresponding to the SS as the HARQ process group.

Optionally, in some implementations of the present disclosure, the determination unit 310 is more specifically configured to: determine an HARQ process group indicated in configuration information corresponding to the control resource set (CORESET) corresponding to the SS as the HARQ process group.

Optionally, in some implementations of the present disclosure, the configuration information is information configured based on a radio resource control (RRC) signaling and/or a media access control (MAC) Control Element (CE).

Optionally, in some implementations of the present disclosure, the communication unit 320 is further configured to: receive the indication information sent by a network device, wherein the indication information is used for indicating an HARQ process group to which the HARQ process belongs.

Optionally, in some implementations of the present disclosure, the communication unit 320 is specifically configured to: receive downlink control information (DCI) sent by the network device, wherein scrambling information and/or RNTI information of the DCI is used for indicating the HARQ process group to which the HARQ process belongs.

Optionally, in some implementations of the present disclosure, the signal includes at least one physical uplink shared channel (PUSCH) and/or at least one physical downlink shared channel (PDSCH).

Optionally, in some implementations of the present disclosure, the signal include a signal sent to or received from the terminal device through at least one of at least one transmission reception point (TRP), at least one antenna panel and at least one beam.

It should be understood that the device implementations and the method implementations may correspond to each other, and description of the method implementations may be referred to for similar description of the device implementations. Specifically, the terminal device 300 shown in FIG. 4 may correspond to a corresponding subject in the method 200 of an implementation of the present disclosure, and the above and other operations and/or functions of each unit in the terminal device 300 are respectively for realizing each corresponding flow of the method in FIG. 3, and will not be repeated here for the sake of brevity.

Figure 5:
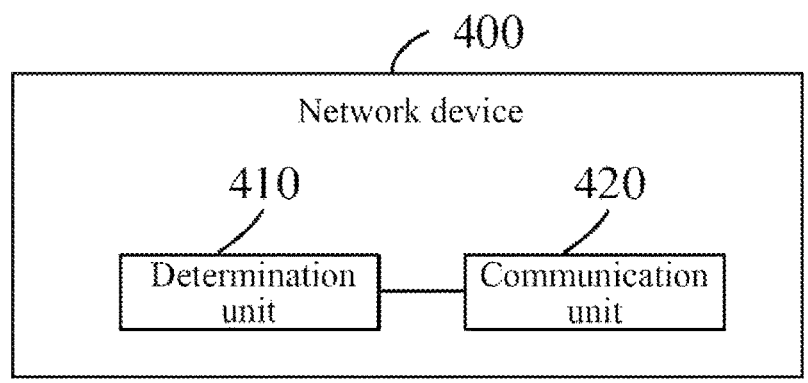
FIG. 5 is a schematic block diagram of a network device according to an implementation of the present disclosure.

FIG. 5 is a schematic block diagram of a network device according to an implementation of the present disclosure; As shown in FIG. 5, the network device 400 may include: a determination unit 410 configured to determine a hybrid automatic repeat request (HARQ) process; and a communication unit 420 configured to receive and/or send a signal from/to a terminal device according to the HARQ process.

Optionally, in some implementations of the present disclosure, the determination unit 410 is specifically configured to: generate configuration information, wherein the configuration information is used for the terminal device to determine the number of bits of a process number of the HARQ process; and the communication unit 420 is further configured to: send the configuration information to the terminal device.

Optionally, in some implementations of the present disclosure, the configuration information includes: the number of physical downlink control channels (PDCCH) that the terminal device needs to detect at the same time.

Optionally, in some implementations of the present disclosure, the configuration information includes: the number of bits of the process number of the HARQ process.

Optionally, in some implementations of the present disclosure, the determination unit 410 is specifically configured to: generate configuration information, wherein the configuration information is used for the terminal device to determine whether a target domain exists and/or the number of bits corresponding to the target domain, and the target domain is used for the terminal device to determine an HARQ process group; and the communication unit 420 is further configured to: send the configuration information to the terminal device.

Optionally, in some implementations of the present disclosure, the configuration information includes: the number of physical downlink control channels (PDCCH) that the terminal device needs to detect at the same time.

Optionally, in some implementations of the present disclosure, the configuration information includes: the number of bits corresponding to the target field.

Optionally, in some implementations of the present disclosure, the configuration information includes: the number of HARQ process groups.

Optionally, in some implementations of the present disclosure, the communication unit 420 is specifically configured to: send the configuration information to the terminal device through at least one of downlink control information (DCI), radio resource control (RRC) signaling and media access control (MAC) Control Element (CE).

Optionally, in some implementations of the present disclosure, the determination unit 410 is specifically configured to: determine an HARQ process group to which the HARQ process belongs; and determine the HARQ process according to the HARQ process group and a process number of the HARQ process.

Optionally, in some implementations of the present disclosure, the determination unit 410 is more specifically configured to: determine the HARQ process group according to a search space (SS) of the terminal device.

Optionally, in some implementations of the present disclosure, the determination unit 410 is more specifically configured to: determine an HARQ process group corresponding to an SS group to which the SS belongs as the HARQ process group to which the HARQ process belongs.

Optionally, in some implementations of the present disclosure, the determination unit 410 is more specifically configured to: determine, according to a control resource set (CORESET) corresponding to the SS, an HARQ process group corresponding to a CORESET group to which the CORESET belongs as the HARQ process group.

Optionally, in some implementations of the present disclosure, the determination unit 410 is more specifically configured to: determine an HARQ process group indicated in configuration information corresponding to the SS as the HARQ process group.

Optionally, in some implementations of the present disclosure, the determination unit 410 is more specifically configured to: determine an HARQ process group indicated in configuration information corresponding to a control resource set (CORESET) corresponding to the SS as the HARQ process group.

Optionally, in some implementations of the present disclosure, the configuration information is information configured based on a radio resource control (RRC) signaling and/or a media access control (MAC) Control Element (CE).

Optionally, in some implementations of the present disclosure, the determination unit 410 is specifically configured to: generate indication information, wherein the indication information is used for indicating an HARQ process group to which the HARQ process belongs; and the communication unit 420 is further configured to: send the indication information to the terminal device.

Optionally, in some implementations of the present disclosure, the communication unit 420 is specifically configured to: send downlink control information (DCI) to the terminal device, wherein scrambling information and/or RNTI information of the DCI are used for indicating the HARQ process group to which the HARQ process belongs.

Optionally, in some implementations of the present disclosure, the signal includes at least one physical uplink shared channel (PUSCH) and/or at least one physical downlink shared channel (PDSCH).

Optionally, in some implementations of the present disclosure, the signal include a signal sent to or received from the terminal device through at least one of at least one transmission reception point (TRP), at least one antenna panel and at least one beam.

It should be understood that the device implementations and the method implementations may correspond to each other, and description of the method implementations may be referred to for similar description of the device implementations. Specifically, the network device 400 shown in FIG. 5 may correspond to a corresponding subject in the method 200 of an implementation of the present disclosure, and the above and other operations and/or functions of each unit in the network device 400 are respectively for realizing various corresponding flows of the method in FIG. 3, and will not be repeated here for the sake of brevity.

In the above, the communication device according to an implementation of the present disclosure is described from the perspective of functional modules with reference to FIG. 4 and FIG. 5. It should be understood that this functional module may be realized in a form of hardware, or instructions in form of software, or a combination of hardware and software modules.

Specifically, various acts of the method implementations in the implementations of the present disclosure can be implemented by integrated logic circuits of hardware and/or instructions in the form of software in a processor, and the acts of methods disclosed with reference to the implementations of the present disclosure may be directly executed and implemented by a hardware decoding processor, or may be implemented by a combination of hardware and software modules in the decoding processor.

Optionally, the software modules may be located in a storage medium commonly used in the art, such as a random access memory, a flash memory, a read-only memory, a programmable read-only memory, an electrically erasable programmable memory, or a register. The storage medium is located in the memory, and the processor reads the information in the memory and completes the acts of the above method implementations in combination with its hardware.

For example, in an implementation of the present disclosure, the determination unit in FIG. 4 or FIG. 5 may be implemented by a processor, and the communication unit may be implemented by a transceiver.

Figure 6:
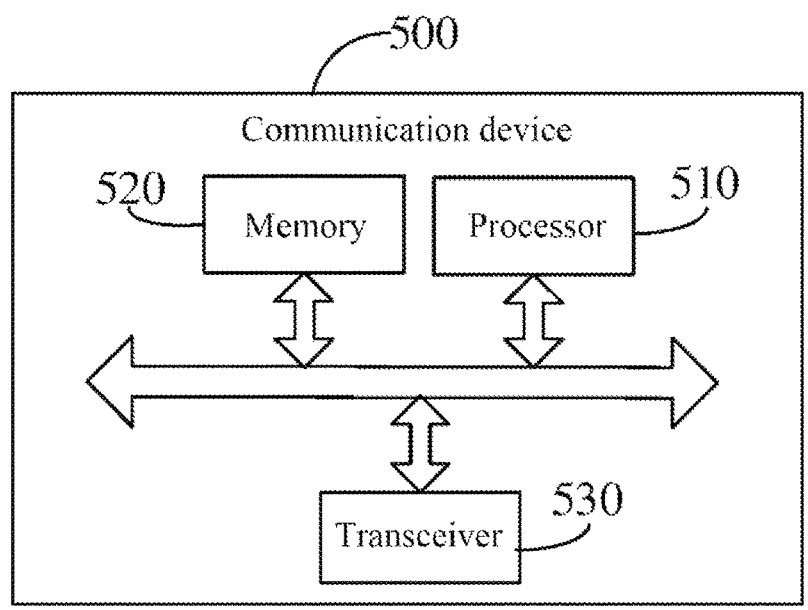
FIG. 6 is a schematic block diagram of a communication device according to an implementation of the present disclosure.

FIG. 6 is a schematic diagram of a structure of a communication device 500 according to an implementation of the present disclosure. The communication device 500 shown in FIG. 6 includes a processor 510, wherein the processor 510 may call and run a computer program from a memory to implement the method in an implementation of the present disclosure.

Optionally, as shown in FIG. 6, the communication device 500 may further include a memory 520. The memory 520 may be configured to store indication information, or may be configured to store codes, instructions, etc., executed by the processor 510. The processor 510 may call and run a computer program from the memory 520 to implement the method in the implementations of the present disclosure.

The memory 520 may be a separate device independent of the processor 510 or may be integrated in the processor 510.

Optionally, as shown in FIG. 6, the terminal device 500 may further include a transceiver 530, and the processor 510 may control the transceiver 530 to communicate with other devices. Specifically, the transceiver may send information or data to other devices or receive information or data sent by other devices.

The transceiver 530 may include a transmitter and a receiver. The transceiver 530 may further include antennas, and the number of antennas may be one or more.

Optionally, the communication device 500 may be a network device according to an implementation of the present disclosure, and the communication device 500 may implement corresponding processes implemented by the network device in various methods according to the implementations of the present disclosure. That is to say, the communication device 500 in the implementations of the present disclosure may correspond to the network device 400 in the implementations of the present disclosure, and may correspond to a corresponding subject executing the method 200 according to the implementations of the present disclosure, which will not be repeated here for the sake of brevity.

Optionally, the communication device 500 may be a terminal device according to an implementation of the present disclosure, and the communication device 500 may implement corresponding processes implemented by the terminal device in various methods according to the implementations of the present disclosure. That is to say, the communication device 500 in the implementations of the present disclosure may correspond to the terminal device 300 in the implementations of the present disclosure, and may correspond to a corresponding subject executing the method 200 according to the implementations of the present disclosure, which will not be repeated here for the sake of brevity.

It should be understood that various components in the communication device 500 are connected through a bus system. In addition to a data bus, the bus system further includes a power bus, a control bus, a status signal bus, etc.

In addition, an implementation of the present disclosure further provides a chip, which may be an integrated circuit chip with a signal processing capability, and can implement or execute the methods, acts and logic block diagrams disclosed in the implementations of the present disclosure.

Optionally, the chip may be applied to various communication devices, so that a communication device with the chip installed therein can perform the disclosed methods, acts and logic block diagrams in the implementations of the present disclosure.

Figure 7:
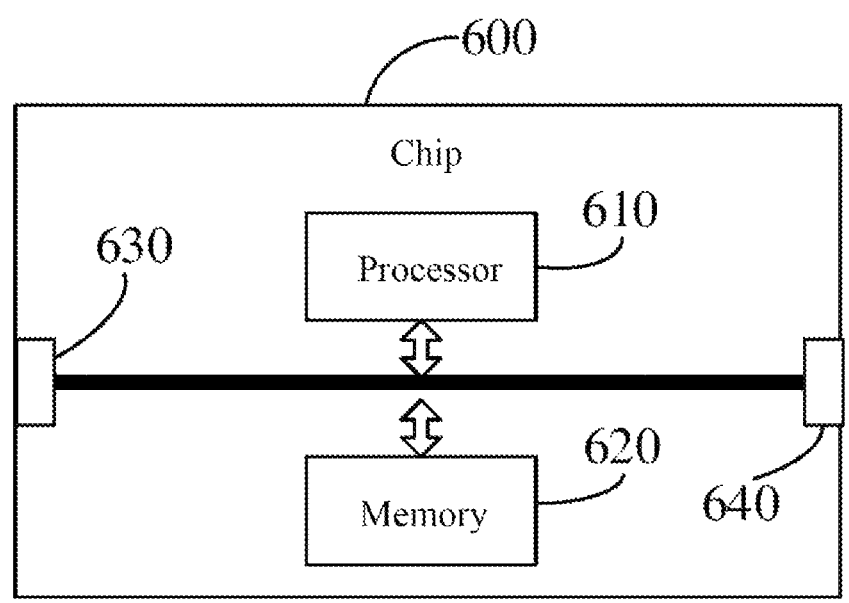
FIG. 7 is a schematic diagram of a chip according to an implementation of the present disclosure.

FIG. 7 is a schematic diagram of a structure of a chip according to an implementation of the present disclosure.

A chip 600 shown in FIG. 7 includes a processor 610, wherein the processor 610 may call and run a computer program from a memory to implement the method in the implementations of the present disclosure.

Optionally, as shown in FIG. 7, the chip 600 may further include a memory 620. The processor 610 may call and run a computer program from the memory 620 to implement the method in the implementations of the present disclosure. The memory 620 may be configured to store indication information, or may be configured to store codes, instructions, etc., executed by the processor 610.

The memory 620 may be a separate device independent of the processor 610 or may be integrated in the processor 610.

Optionally, the chip 600 may further include an input interface 630. The processor 610 may control the input interface 630 to communicate with other devices or chips. Specifically, the processor may acquire information or data sent by other devices or chips.

Optionally, the chip 600 may further include an output interface 640. The processor 610 may control the output interface 640 to communicate with other devices or chips. Specifically, the processor 710 may output information or data to other devices or chips.

Optionally, the chip may be applied to a network device in an implementation of the present disclosure, and the chip may implement corresponding processes implemented by the network device in various methods of the implementations of the present disclosure, which will not be repeated here for the sake of brevity.

Optionally, the chip may be applied to a terminal device in an implementation of the present disclosure, and the chip may implement corresponding processes implemented by the network device in various methods of the implementations of the present disclosure, which will not be repeated here for the sake of brevity.

It should be understood that the chip mentioned in an implementation of the present disclosure may be referred to as a system-level chip, a system chip, a chip system or a system-on-chip, etc. It should also be understood that various components in the chip 600 are connected through a bus system. In addition to a data bus, the bus system further includes a power bus, a control bus, a status signal bus, etc.

The processor may include, but is not limited to: a general purpose processor, a digital signal processor (DSP), an application specific integrated circuit (ASIC), a field programmable gate array (FPGA), or another programmable logic device, discrete gate or transistor logic device, or discrete hardware component, etc.

The processor may be configured to implement or perform various methods, acts and logical block diagrams disclosed in the implementations of the present disclosure. The acts of the method disclosed with reference to implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an erasable programmable memory, or a register. The storage medium is located in the memory, and the processor reads the information in the memory and completes the acts of the above method in combination with its hardware.

The memory includes but is not limited to: a volatile memory and/or nonvolatile memory. The non-volatile memory may be a read-only memory (ROM), a programmable ROM (PROM), an erasable PROM (EPROM), an electrically erasable EPROM (EEPROM), or a flash memory. The volatile memory may be a random access memory (RAM) which serves as an external cache. As an exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synch link DRAM (SLDRAM), and a Direct Rambus RAM (DRRAM).

It should be noted that the memories in the systems and methods described in this specification are intended to include, but are not limited to, these and any other suitable types of memories.

An implementation of the present disclosure further provides a computer readable storage medium configured to store a computer program. The computer readable storage medium stores one or more programs including instructions which, when executed by a portable electronic device including multiple application programs, enable the portable electronic device to perform the methods of the implementations of methods 300 to 500.

Optionally, the computer readable storage medium may be applied to a network device in an implementation of the present disclosure, and the computer program enables the computer to perform the corresponding processes implemented by the network device in various methods of the implementations of the present disclosure, which will not be repeated here for the sake of brevity.

Optionally, the computer readable storage medium may be applied to a mobile terminal/terminal device in an implementation of the present disclosure, and the computer program enables the computer to perform the corresponding processes implemented by the mobile terminal/terminal device in various methods of the implementations of the present disclosure, which will not be repeated here for the sake of brevity.

An implementation of the present disclosure further provides a computer program product including a computer program.

Optionally, the computer readable storage medium may be applied to a network device in an implementation of the present disclosure, and the computer program enables the computer to perform the corresponding processes implemented by the network device in various methods of the implementations of the present disclosure, which will not be repeated here for the sake of brevity.

Optionally, the computer readable storage medium may be applied to a mobile terminal/terminal device in an implementation of the present disclosure, and the computer program enables the computer to perform the corresponding processes implemented by the mobile terminal/terminal device in various methods of the implementations of the present disclosure, which will not be repeated here for the sake of brevity.

An implementation of the present disclosure further provides a computer program. When the computer program is executed by a computer, the computer can perform the method of the implementation shown with the method 200.

Optionally, the computer program may be applied to a network device in an implementation of the present disclosure. When the computer program is run on a computer, the computer is enabled to perform the corresponding processes implemented by the network device in various methods of the implementations of the present disclosure, which will not be repeated here for sake of brevity.

An implementation of the present disclosure further provides a communication system, which includes the above-mentioned terminal device 300 and network device 400, wherein the terminal device 300 and the network device 400 may be configured to implement the corresponding functions implemented by the corresponding executors in the above method 200, which will not be repeated here for the sake of brevity.

It should be noted that the term "system" in this specification may also be referred to as "network management architecture" or "network system", etc.

It should also be understood that the terms used in implementations of the present disclosure and the appended claims are for the purpose of describing specific implementations only, but are not intended to limit implementations of the present disclosure.

For example, the singular forms "a", "said", "aforementioned" and "the" used in the implementations of the present disclosure and the appended claims are also intended to include the plural forms unless the context clearly indicates other meanings.

Those skilled in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Those skilled in the art may use different methods to realize the described functions for each particular application, but such realization should not be considered to be beyond the scope of implementations of the present disclosure.

The function units may be stored in a computer readable storage medium if realized in a form of software functional units and sold or used as a separate product. Based on such understanding, the technical solution of implementations of the present disclosure, in essence, or the part contributing to the existing art, or a part of the technical solution, may be embodied in the form of a software product stored in a storage medium, including several instructions for enabling a computer device (which may be a personal computer, a server, or a network device, etc.) to perform all or part of the acts of the methods described in implementations of the present disclosure. The aforementioned storage medium includes a medium capable of storing program codes, such as a U disk, a mobile hard disk, a read-only memory (ROM), a magnetic disk or an optical disk.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, devices and methods may be implemented in other ways.

For example, the division of the units, modules or components in the above-mentioned device implementations is only a logical function division, and there may be other division manners in actual realization. For example, multiple units, modules or components may be combined or integrated into another system, or some units or components may be ignored or not executed.

For another example, the units/modules/components described above as separate/display components may or may not be physically separated, i.e., they may be located in one place or may be distributed over multiple network units. Some or all of the units/modules/components may be selected according to practical needs to achieve a purpose of the implementations of the present disclosure.

Finally, it should be noted that the mutual coupling or direct coupling or communication connection shown or discussed in the above may be indirect coupling or communication connection between apparatuses or units through some interfaces, and may be in electrical, mechanical or other forms.

The foregoing is merely exemplary implementations of the present disclosure, but the protection scope of implementations of the present disclosure is not limited thereto. Any person skilled in the art may easily conceive variations or substitutions within the technical scope disclosed by implementations of the present disclosure, which should be included within the protection scope of implementations of the present disclosure. Therefore, the protection scope of the implementations of the present disclosure should be decided by the protection scope of the claims.

What is claimed is:

1. A wireless communication method, comprising:
   determining, by a terminal device, a hybrid automatic repeat request (HARQ) process; and
   receiving and/or sending, by the terminal device, a signal according to the HARQ process;
   wherein before determining, by the terminal device, the hybrid automatic repeat request (HARQ) process, the method further comprises:
      receiving, by the terminal device, configuration information sent by a network device; and
      determining, by the terminal device, a number of bits of a process number of the HARQ process according to the configuration information;
   wherein the configuration information comprises: a number of physical downlink control channels (PDCCH) that the terminal device needs to detect at a same time,
   or,
   the configuration information comprises: the number of bits of the process number of the HARQ process;
   wherein determining, by the terminal device, the hybrid automatic repeat request (HARQ) process comprises:
      determining, by the terminal device, an HARQ process group to which the HARQ process belongs; and
      determining, by the terminal device, the HARQ process according to the HARQ process group and the process number of the HARQ process,
      wherein determining, by the terminal device, the HARQ process group to which the HARQ process belongs comprises:
         determining, by the terminal device, the HARQ process group according to a search space (SS) of the terminal device.

2. The method of claim 1, wherein the configuration information comprises: a number of HARQ process groups.

3. The method of claim 1, wherein receiving, by the terminal device, the configuration information sent by the network device comprises:
   receiving, by the terminal device, the configuration information sent by the network device through at least one of downlink control information (DCI), radio resource control (RRC) signaling, or media access control (MAC) Control Element (CE).

4. The method of claim 1, wherein determining, by the terminal device, the HARQ process group according to the search space (SS) of the terminal device comprises:
   determining, by the terminal device, an HARQ process group corresponding to an SS group to which the SS belongs as the HARQ process group to which the HARQ process belongs,
   or,
   determining, by the terminal device, the HARQ process group according to the search space (SS) of the terminal device comprises:
      determining, by the terminal device, according to a control resource set (CORESET) corresponding to the SS, an HARQ process group corresponding to a CORESET group to which the CORESET belongs as the HARQ process group,
   or,
   determining, by the terminal device, the HARQ process group according to the search space (SS) of the terminal device comprises:
      determining, by the terminal device, an HARQ process group indicated in configuration information corresponding to the SS as the HARQ process group,
   or,
   determining, by the terminal device, the HARQ process group according to the search space (SS) of the terminal device comprises:
      determining, by the terminal device, an HARQ process group indicated in configuration information corresponding to a control resource set (CORESET) corresponding to the SS as the HARQ process group,
      wherein the configuration information is information configured based on a radio resource control (RRC) signaling and/or a media access control (MAC) Control Element (CE).

5. The method of claim 1, wherein the signal comprises at least one physical uplink shared channel (PUSCH) and/or at least one physical downlink shared channel (PDSCH).

6. A terminal device, comprising: a processor and a transceiver, wherein
   the processor is configured to determine a hybrid automatic repeat request (HARQ) process;
   the transceiver is configured to receive and/or send a signal according to the HARQ process;
   wherein the transceiver is further configured to:
      receive configuration information sent by a network device,
      wherein the processor is specifically configured to:
      determine a number of bits of a process number of the HARQ process according to the configuration information;
      wherein the configuration information comprises: a number of physical downlink control channels (PDCCH) that the terminal device needs to detect at a same time,
      or,
      the configuration information comprises: the number of bits of the process number of the HARQ process;
   wherein the processor is specifically configured to:
      determine an HARQ process group to which the HARQ process belongs; and
      determine the HARQ process according to the HARQ process group and the process number of the HARQ process,
      wherein the processor is more specifically configured to:
      determine the HARQ process group according to a search space (SS) of the terminal device.

7. The terminal device of claim 6, wherein
the configuration information comprises: a number of HARQ process groups.

8. The terminal device of claim 6, wherein the transceiver is specifically configured to:
   receive the configuration information sent by the network device through at least one of downlink control information (DCI), radio resource control (RRC) signaling, or media access control (MAC) Control Element (CE).

9. The terminal device of claim 6, wherein the processor is more specifically configured to:
   determine an HARQ process group corresponding to an SS group to which the SS belongs as the HARQ process group to which the HARQ process belongs,
   or,
   the processor is more specifically configured to:
      determine, according to a control resource set (CORESET) corresponding to the SS, an HARQ process group corresponding to a CORESET group to which the CORESET belongs as the HARQ process group, or, the processor is more specifically configured to:
determine an HARQ process group indicated in configuration information corresponding to the SS as the HARQ process group, or, the processor is more specifically configured to:
determine an HARQ process group indicated in configuration information corresponding to the control resource set (CORESET) corresponding to the SS as the HARQ process group,
wherein the configuration information is information configured based on a radio resource control (RRC) signaling and/or a media access control (MAC) Control Element (CE).

10. The terminal device of claim 6, wherein the signal comprises at least one physical uplink shared channel (PUSCH) and/or at least one physical downlink shared channel (PDSCH).

11. A wireless communication method, comprising:
determining, by a network device, a hybrid automatic repeat request (HARQ) process; and
receiving and/or sending, by the network device, a signal from or to a terminal device according to the HARQ process;
wherein the method further comprises:
generating, by the network device, configuration information, wherein the configuration information is used for the terminal device to determine a number of bits of a process number of the HARQ process; and
sending, by the network device, the configuration information to the terminal device;
wherein the configuration information comprises: a number of physical downlink control channels (PDCCH) that the terminal device needs to detect at a same time, or, the configuration information comprises: the number of bits of the process number of the HARQ process;
wherein determining, by the network device, the hybrid automatic repeat request (HARQ) process comprises:
determining, by the network device, an HARQ process group to which the HARQ process belongs; and
determining, by the network device, the HARQ process according to the HARQ process group and the process number of the HARQ process,
wherein determining, by the network device, the HARQ process group to which the HARQ process belongs comprises:
determining, by the network device, the HARQ process group according to a search space (SS) of the terminal device.

12. The method of claim 11, wherein sending, by the network device, the configuration information to the terminal device comprises:
sending, by the network device, the configuration information to the terminal device through at least one of downlink control information (DCI), radio resource control (RRC) signaling, or media access control (MAC) Control Element (CE).

13. The method of claim 11, wherein the signal comprises at least one physical uplink shared channel (PUSCH) and/or at least one physical downlink shared channel (PDSCH).

14. A network device, comprising: a processor and a transceiver, wherein
the processor is configured to determine a hybrid automatic repeat request (HARQ) process;
the transceiver is configured to receive and/or send a signal from or to a terminal device according to the HARQ process;
wherein the processor is further configured to generate configuration information, wherein the configuration information is used for the terminal device to determine a number of bits of a process number of the HARQ process; and
the transceiver is further configured to send the configuration information to the terminal device;
wherein the configuration information comprises: a number of physical downlink control channels (PDCCH) that the terminal device needs to detect at a same time, or, the configuration information comprises: the number of bits of the process number of the HARQ process;
wherein the processor is specifically configured to:
determine an HARQ process group to which the HARQ process belongs; and
determine the HARQ process according to the HARQ process group and the process number of the HARQ process,
wherein the processor is more specifically configured to:
determine the HARQ process group according to a search space (SS) of the terminal device.

15. The network device of claim 14, wherein the transceiver is specifically configured to:
send the configuration information to the terminal device through at least one of downlink control information (DCI), radio resource control (RRC) signaling, or media access control (MAC) Control Element (CE).

16. The network device of claim 14, wherein the signal comprises at least one physical uplink shared channel (PUSCH) and/or at least one physical downlink shared channel (PDSCH).

* * * * *